No. 848,096. PATENTED MAR. 26, 1907.
L. FRITSCHKA & C. KOCH.
POWER TRANSMISSION DEVICE.
APPLICATION FILED JUNE 28, 1906.

2 SHEETS—SHEET 1.

WITNESSES

INVENTORS
Leo Fritschka
Carl Koch
by Arbt. Klotz
Atty.

THE NORRIS PETERS CO., WASHINGTON, D. C.

No. 848,096. PATENTED MAR. 26, 1907.
L. FRITSCHKA & C. KOCH.
POWER TRANSMISSION DEVICE.
APPLICATION FILED JUNE 28, 1906.

2 SHEETS—SHEET 2.

WITNESSES

INVENTORS
Leo Fritschka
Carl Koch
by Robt. Klotz
Atty.

UNITED STATES PATENT OFFICE.

LEO FRITSCHKA AND CARL KOCH, OF CHICAGO, ILLINOIS.

POWER-TRANSMISSION DEVICE.

No. 848,096. Specification of Letters Patent. Patented March 26, 1907.

Application filed June 28, 1906. Serial No. 323,959.

*To all whom it may concern:*

Be it known that we, LEO FRITSCHKA and CARL KOCH, citizens of the United States, residing at Chicago, in the county of Cook and State of Illinois, have invented certain new and useful Improvements in Power-Transmission Devices, of which the following is a specification.

Our invention relates to improvements in power-transmission devices, and refers to a device of this character particularly adaptable for use on motor-vehicles.

The object of our invention is the provision of a frictional power-transmitting device which may be readily operated to change the speed of the driven element or to reverse the movement of the said element.

A further object of the invention is to provide a device of the character stated which may be used for stationary work as well as for the propulsion of vehicles, which will be of simple and durable construction, and which will be reliable and effective in operation.

With these and other objects in view our invention consists of a driving-gear, a friction-disk driven thereby, a driven gear radially movable on the friction-disk operating a bevel-gear, a driven shaft with spaced bevel-gears thereon, means for shifting the driven bevel-gear to engagement with the spaced bevel-gears, and means for shifting the driven gear on the friction-disk to change the speed thereof.

Our invention also consists of certain other novel features of construction, combination, and arrangement of parts, substantially as disclosed herein.

Figure 1:
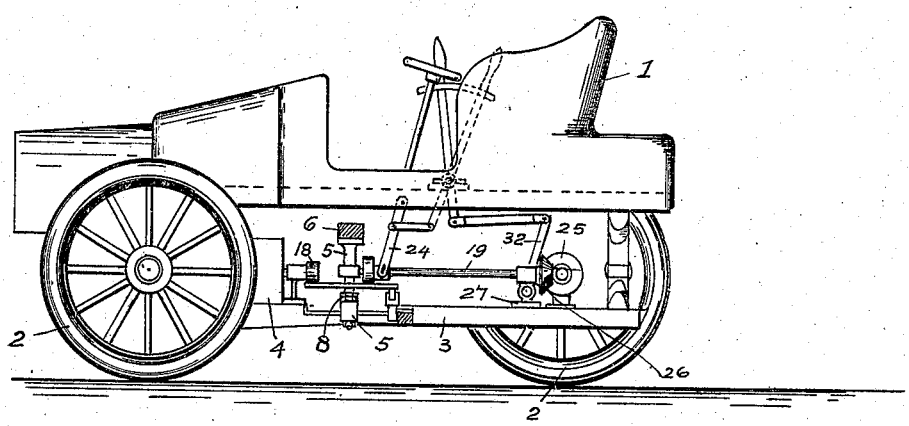
Figure 2:
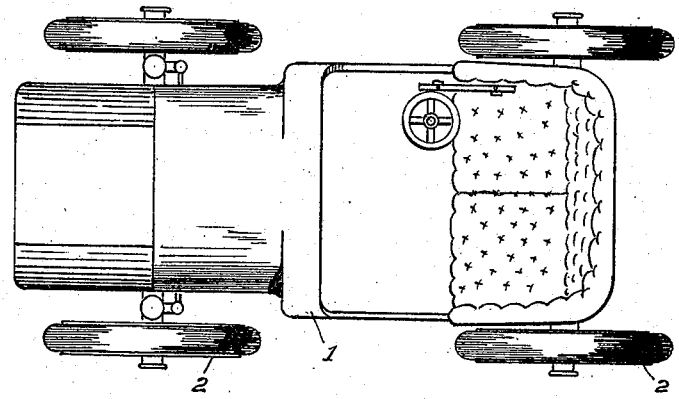
Figure 3:
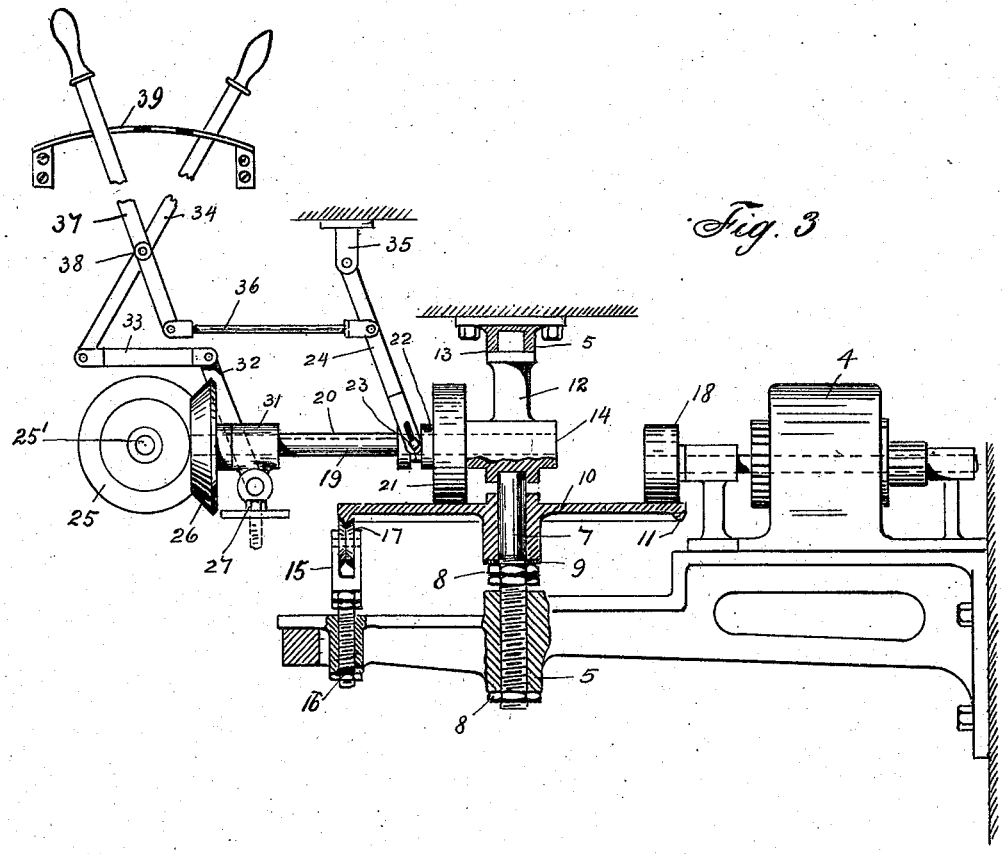
Figure 4:
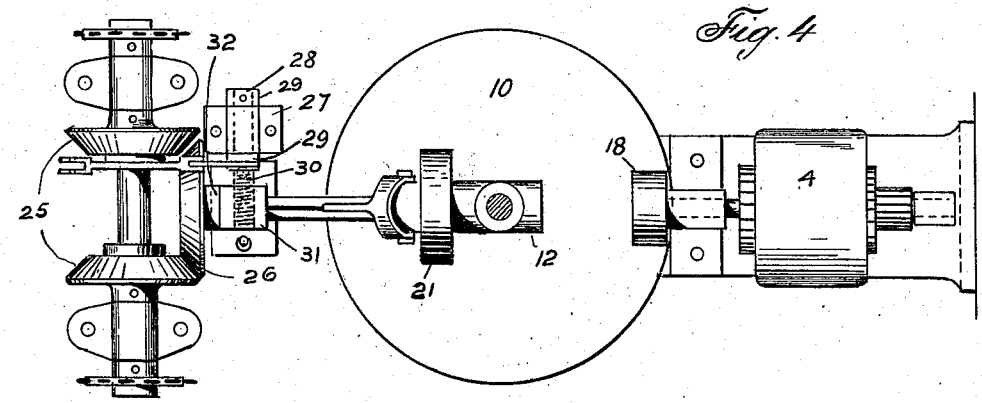

Figure 1 is a side elevation of a motor-vehicle with parts broken away to show our power-transmission device installed therein. Fig. 2 is a top plan view of the same. Fig. 3 is a side elevation, partly in section, of the complete friction transmission and shifting means. Fig. 4 is a top plan view thereof.

In the drawings the numeral 1 designates the body of the vehicle, supported in the usual manner upon the wheels 2.

Suspended from the running-gear is a framework 3, mounted at the forward end of which is a motor 4, either electric or otherwise.

Vertical bearings 5 are mounted on the transverse bars 6 in rear of the motor, and in the lower bearing is secured a shaft 7, having a lower threaded end engaged in the threaded bearing. Lock-nuts 8 are secured upon the shaft at each end of the bearing, and above the uppermost lock-nut a washer 9 is provided.

Rotatably mounted above the washer on the shaft is a friction-disk 10, formed with an annular rim 11 on the lower face thereof.

A standard 12 is mounted upon the upper end of the shaft or post 7 and is formed with the upper shouldered end 13 engaged in the upper vertical bearing. This standard is further formed with a journal-bearing 14 on a plane parallel to the face of the disk.

A bracket 15 is mounted upon a bolt-stem 16 at the rear side of the friction-disk, and in the bracket is journaled a grooved guiding and supporting roller 17, which engages the annular rim on the friction-disk.

A driving-gear 18 on the motor-shaft engages the face of the friction-disk at the forward edge thereof.

Journaled in the horizontal bearing of the standard is a horizontal shaft 19, formed with a longitudinal groove or keyway 20, and slidable on said shaft is a gear 21, having an internal lug or key to engage the keyway on the shaft. This gear is in contact with the friction-disk and may be provided with a friction-surface, and the driving-gear may be provided likewise. The driven gear 21 is provided with a hub 22, formed with an annular groove 23 to receive the arms of the shifting-fork 24.

In the application of our invention to an auto vehicle the rear axle may be driven directly by the driven gear and shaft, (illustrated in Fig. 1,) or a counter-shaft may be employed and the rear wheels driven by chain-and-sprocket connections. (Not shown.) In the former case spaced and oppositely-facing bevel-gears 25 are rigidly mounted upon the rear axle or power-shaft 25', and a bevel-gear 26 is mounted upon the rear end of the driven shaft and is adapted to engage the bevel-gears on the rear axle. The bevel-gears are spaced on the axle so that the driving bevel-gear may not come in contact with both gears at the same time, and the said driving-gear is shifted between the bevel-gears in the following manner: A bearing or journal block 27 is carried by the frame near the rear end of the driven shaft, and journaled in the block is a rocker-shaft 28. The rocker-shaft is secured in the block against longitudinal movement by means of the retaining-collars 29. The free extended end of the rocker-shaft is formed with heavy threads 30, and supported on said threaded end is a movable journal-block 31, in which is journaled the driven shaft. A rocker-arm 32 is secured to the rocker-shaft and is connected by the link 33 to the reversing-lever 34. The shifting-fork 24 is pivoted in a bracket 35 and is connected by a link 36 to the speed-changing lever 37. These levers may both be journaled on the same rod or bolt 38, so as to engage opposite sides of the segment-bar 39. By shifting the reversing-lever the rocker-shaft forces the driving bevel-gear into engagement with one of the bevel-gears on the axle or shaft and by shifting the lever in the reverse direction the direction of the rotation of the driven element is reversed. The bevel-gears also act as a clutch, as the members may be thrown out of engagement by shifting the reversing-lever and throwing the driving bevel-gear to a neutral point midway between the driven bevel-gears and out of engagement therewith. To change the speed of the driven member, the speed-changing lever is shifted, which moves the friction-gear radially on the friction plate or disk, thereby changing the speed of rotation. The parts are all adjustable, so that lost motion may be accounted for at any time.

We have described our improved driving arrangement particularly as applied to a motor-vehicle, but of course it will be understood that the device may be used wherever variation of speed or reversal of motion is required.

It will be understood that various alterations may be made in the construction of the device without departing from the spirit of the invention, and what we claim as our invention, and desire to secure by Letters Patent, is set forth in the appended claims.

We claim—

1. In a power-transmission device, the combination with a friction-disk, a driving-gear therefor, of a driven gear in contact with the friction-disk and capable of radial movement thereon, a driven shaft and bevel-gear, a power-shaft, spaced bevel-gears thereon, and means for shifting the driven bevel-gear between the spaced bevel-gears.

2. In a power-transmission device, the combination with a friction-disk and a driving-gear therefor, of a driven gear radially slidable on the friction-disk, a driven bevel-gear, a power-shaft, spaced bevel-gears thereon, a rocker-shaft for shifting the driven bevel-gear between the spaced bevel-gears, and means for shifting the driven gear on the friction-disk.

3. A transmission device comprising a friction-disk, a driving-gear in engagement therewith, a driven gear radially movable on the disk, shifting means for said gear, a driven bevel-gear, a rocker-shaft for laterally shifting said bevel-gear, and spaced bevel-gears adapted for engagement with the driven bevel-gear.

4. The combination with a friction-disk, of means for supporting the disk, a driving-gear engaging the disk, a shaft pivoted centrally over the friction-disk, a driven gear on said shaft capable of radial movement on the disk, a driven bevel-gear, a rocker-shaft having threaded engagement to shift the driven shaft, a power-shaft, spaced bevel-gears thereon adapted for engagement with the driven bevel-gear.

5. The combination with a friction-disk, a pivotal post for the disk, means for supporting the edge of the disk, a journal-bearing pivoted on the post, a shaft in said bearing, a gear on the shaft radially slidable on the friction-disk, means for shifting said driven gear, and a bevel-gear on the driven shaft, of a rocker-shaft having threaded engagement and adapted to shift the driven shaft laterally, a power-shaft, and spaced opposing bevel-gears on said power-shaft adapted for engagement with the driven bevel-gear.

In testimony whereof we have hereunto signed our names in the presence of two subscribing witnesses.

LEO FRITSCHKA.
CARL KOCH.

In presence of—
J. C. GOOSMANN,
JOE CLIFTON.